Patented Nov. 19, 1935

2,021,172

UNITED STATES PATENT OFFICE 2,021,172

PAPER IMPERVIOUS TO MOISTURE, WATER, AND GREASE

Edmond H. Bucy, Waukegan, Ill., assignor to Atlas Powder Company, North Chicago, Ill., a corporation of Delaware No Drawing. Application January 21, 1933, Serial No. 652,938

14 Claims. (Cl. 91—68)

This invention relates to paper and it particularly relates to such paper which is proof to water in its liquid state as well as in vapor form and, furthermore, is proof to grease, fats, paints and similar substances, which when they incidentally contact with and penetrate the paper render the same unsightly and unsuitable for the intended purposes.

There are papers on the market which fill certain requirements exacted in this respect by the trade, but some of these papers are not physically resistant enough, or are not impervious enough, and are rendered unsightly, particularly when coming in contact with grease.

In the manufacture of impervious papers the cost of production is the point which invites careful attention, as such impervious papers, except in cases where transparency stands in the foreground, are mostly utilized for purposes where the expense must be lowered to a minimum.

For the manufacture of such impervious papers a great variety of substances have been applied, for instance, cellulose ester compounds, condensation products of formaldehyde and phenols, occasionally with admixtures of urea. Such papers are mostly suitable for special purposes only; so the transparent papers made from cellulose derivatives are too costly except when they are to be used for wrapping papers where the contents are to be exposed to the inspection of the prospective customer. Other papers, comprising phenol condensation products, are not pliable enough to find a utilization; when paper is coated with phenol condensation products it is usually turned into a stiff board and is thus turned into a product having quite a different field of application than the paper from which it was made. By coating with phenol condensation products paper loses all elasticity and its original wide field of application is thereby reduced to one, relatively large, field, namely, that of serving as insulator in electrical devices. For other utilizations such paper is usually coated on its surfaces only with phenol-condensation products and is, moreover, too brittle, so that it readily cracks as to be unfit as a protection against water, or moisture, or grease and similar substances capable of permeating paper.

A drawback in the manufacture of paper coated with phenol-formaldehyde and similar condensation products is the rather long drying period of such coatings, which almost make impossible the application of such condensation products in a production where each step follows the other in quick succession, the drying time required in that instance between coating the stock and stacking or re-reeling it is too long and prohibitive.

I have now found that I can produce a flexible and non-tacky paper rendered impervious to water, moisture, grease and other substances similar to the latter by combining with the paper an oil soluble phenol condensation product with a drying oil, casein, driers, plasticizers and dissolving these ingredients in various solvents.

As a phenol condensation product I may apply any member of the type of the products obtained by condensing phenol with formaldehyde, including also the products obtained with other aldehydes, phenol-furfural condensation products, cumarone-resin urea-formaldehyde condensation products, such as formaldehyde with a mixture of phenols and urea, the condensation products described by Bucy and Watkins in their application entitled "Condensation products of phenol-phthalein" and filed in the United States Patent Office under Serial No. 629,878, and many other synthetic resins of similar character.

Another ingredient of the combination forming the subject matter of this application is casein or such other adhesives, as glue, gelatine, vegetable gums, such as dextrin, starch, gum arabic and the like.

These aforesaid materials are very suitable for the purposes of my invention, though I prefer casein because of the difficulty of dissolving it in water. I dissolve the casein in ammonia water, which I prefer to other alkaline dissolving agents because the ammonia readily escapes from the film applied to the paper and allows the casein to revert to its insoluble condition. Casein is already widely used in the paper as a paper coating material, particularly in colored paper and it is also occasionally used as a binder.

In the present invention casein helps the phenol-formaldehyde, or other similar substance, to penetrate the body of the paper and to form with the fibers of the same a kind of felt, to render the paper grease-proof, and also aids in producing a flexible film, so that the final paper product can be bent without cracking.

The drying oil which I prefer to apply is China wood oil, which may be replaced, though, in whole or in part by any other oils, such as linseed, castor, rape seed oil and like drying oils.

The application of driers depends on the final requirements which the impervious paper is expected to fulfill; thus for instance, the shade of the desired product suggests occasionally a drier of light color, or allows application of a very active, but dark colored drier; also the nature of the applied oil calls occasionally for one drier in preference to another; however, cobalt lineolate and manganese rosinate have been found to give satisfactory results up to now, though any of the well known driers, as set forth in Martin's "Industrial Organic Chemistry", 1922, on page 47, will do just as well.

I may also incorporate into the combination one or a plurality of stabilizers, or plasticizers, such as triphenylphosphate, tricresylphosphate, triethanolamine and its soaps, borax, naphthenic acid, or any one of the number of other emulsion plasticizers.

In an example of one of the various ways of how I may proceed in carrying my invention into effect I first cook the resin with oil to make up, preferably, a medium long oil varnish. The length in oil of the varnish is not critical of the final results and a considerable latitude in the quantity of oil is therefore allowed. For instance, I prepare in any of the well known ways a phenol-formaldehyde resin of the type known to furnish a varnish when boiled with drying oils, such as linseed oil, China wood oil and other like drying oils, e. g. the types known in commerce by the trade names "Bekalite", "Paranol", "Durite", "Bakelite".

After the first stage of reaction between the phenol and formaldehyde or formaldehyde developing substances has been reached, I separate the oily reaction products and heat the same in the way known to varnish makers at a temperature of from 200–500° C. with a drying oil, linseed oil, or China wood oil. I usually make a batch of twenty gallons of this varnish.

After the varnish has been cooked, it is adjusted with toluol, or a solvent known as V. M. & P. a trade term for paint makers' naphtha, or a combination of the two, so that it contains 50% of solid and 50% of liquid ingredients. Other solvents of higher or lower boiling points may be applied for this purpose with the same result.

After the oil varnish has thus been made I introduce the casein solution. This casein solution is made by dissolving 1 lb. of casein for each gallon of water to which just enough ammonia water has been added to cause the casein to dissolve in the water when slightly warmed. Five gallons of such casein solution are added to five gallons of the oil varnish, which yields an emulsion of these substances.

Though the specific weight of the varnish, made as described above, varies of course within a rather wide range according to the oils and solvents applied, it may be stated that five gallons of the varnish contain approximately 15–30 lbs. of solids; the proportion of casein to the other solids, in the ten gallons of the mixture or emulsion, is 5 lbs. casein to 20 lbs. of solids, or approximately 1:4. Lower ratios may be applied and the range may suitably vary from approximately 1:2 to 1:5 by weight.

Into these ten gallons I stir approximately 1% of a natural resin solution, for instance, one pint of damar solution, preferably one in benzene, from which the wax has been removed and which contains 3 lbs. dewaxed damar resin per gallon. Other natural resins, similar in their properties to damar, may be added instead of damar. At the same time also the small amount of stabilizer, for instance, 60 gr. of triethanolamine, is introduced into the mixture, which is then thinned with a varnish solvent, such as toluol, xylol, butyl-alcohol, turpentine, naphtha, benzene, etc., or with water.

Finally I may add to the emulsion a small amount of wax, for instance, 2 gr. of carnauba wax, or stearic acid, or paraffin, dissolved in a volatile solvent, e. g. toluene, per gallon of above mixture.

In order to introduce these waxes, or wax-like material, it may be necessary first to dissolve the solid wax-like material in appropriate solvent, preferably by the addition of a small amount of heat. This solution may then be incorporated mechanically into the final emulsion.

The viscosity of the emulsion can be varied at will, as described further below; it may be applied by spraying, by a coating machine, swab or total immersion and this is thus obviously done in any of the well known ways.

The material, to which the emulsion is applied, may be paper of any commercial quality, in sheets, or long webs, or fabrics, or other stock of fibrous material.

This coating may also be used on fabrics, asbestos sheeting or other material which may be coated in any of the well known manners as mentioned above.

While I am aware that the emulsion may also be readily applied to transparent sheets, or webs, made of regenerated cellulose, such as viscose, or cuprammonium cellulose, or of denitrated cellulose nitrate, or of cellulose acetate, or other cellulose derivatives, such as the ethers, the high cost of such materials appears at present prohibitive for the purposes for which the products of the present invention are intended.

What I claim is:

1. A flexible sheet of paper coated with a composition comprising an oil soluble synthetic resin in solution in a drying oil, and an adhesive, said coat being proof to moisture, water and grease.

2. A flexible and non-tacky sheet of paper coated with a composition comprising an oil soluble condensation product of the phenol-formaldehyde type in solution in a drying oil, and an adhesive, said coat being proof to moisture, water and grease.

3. A flexible sheet of paper coated with a composition comprising an oil soluble condensation product of the phenol-formaldehyde type in solution in a drying oil, and casein, said coat being proof to moisture, water and grease.

4. A flexible sheet of paper coated with a composition comprising an oil soluble condensation product of the phenol-formaldehyde type in solution in a drying oil, an adhesive, driers, and a plasticizer, said coat being proof to moisture, water and grease.

5. A flexible sheet of paper coated with a composition comprising an oil soluble condensation product of the phenol-formaldehyde type in solution in a drying oil, casein, driers, and a plasticizer, said coat being proof to moisture, water and grease.

6. A flexible sheet of paper coated with a composition comprising an oil soluble condensation product of the phenol-formaldehyde type in solution in a drying oil, and an adhesive, said coat being proof to moisture, water and grease and containing the adhesive and the phenol condensation product approximately within the limits between 1:2 and 1:5 by weight, respectively.

7. A flexible sheet of paper coated with a composition comprising an oil soluble condensation product of the phenol-formaldehyde type in solution in a drying oil, and an adhesive, said coat being proof to moisture, water and grease and containing the adhesive and the phenol condensation product in the ratio 1:4, respectively.

8. A flexible sheet of paper coated with a composition comprising an oil soluble condensation product of the phenol-formaldehyde type in solution in a drying oil, and casein, said coat being proof to moisture, water and grease and containing the casein and the phenol condensation product approximately within the limits between 1:2 and 1:5 by weight, respectively.

9. A flexible sheet of paper coated with a composition comprising an oil soluble condensation product of the phenol-formaldehyde type in solution in a drying oil, and casein, said coat being proof to moisture, water and grease and containing the casein and the phenol condensation product in the ratio 1:4, respectively.

10. A flexible sheet of paper coated with a composition comprising an oil soluble condensation product of phenol and formaldehyde in solution in a drying oil, casein, and a plasticizer, said coat being proof to moisture, water and grease and containing the casein and the phenol-formaldehyde condensation product in the limits between 1:2 and 1:5 by weight, respectively.

11. A flexible sheet of paper coated with a composition comprising an oil soluble condensation product of phenol and formaldehyde in solution in a drying oil, casein, and a plasticizer, said coat being proof to moisture, water and grease and containing the casein and the phenol-formaldehyde condensation product in the ratio 1:4, respectively.

12. A flexible sheet of paper coated with a composition comprising an oil soluble condensation product of the phenol-formaldehyde type in solution in linseed oil, casein, gum damar, triethanolamine, and carnauba wax, said coat being proof to moisture, water and grease.

13. A flexible fibrous sheet material coated with an oil varnish in which are dissolved resins of the phenol-formaldehyde type, and an adhesive dispersed in said varnish.

14. A flexible fibrous sheet material saturated with an oil varnish in which are dissolved resins of the phenol-formaldehyde type, and an adhesive dispersed in said varnish.

EDMOND H. BUCY.